United States Patent [19]

Jeffrey et al.

[11] 4,451,442

[45] May 29, 1984

[54] REMOVAL OF HYDROGEN SULFIDE FROM FLUID STREAMS WITH MINIMUM PRODUCTION OF SOLIDS

[75] Inventors: Gaines C. Jeffrey, Houston; Lance A. Cooper, Lake Jackson, both of Tex.; Sharon S. Whipple, Sanford, Mich.

[73] Assignee: The Dow Chemical Company, Midland, Mich.

[21] Appl. No.: 390,617

[22] Filed: Jun. 21, 1982

[51] Int. Cl.³ ............................................. B01D 53/34
[52] U.S. Cl. .................................. 423/224; 423/226; 423/514; 423/DIG. 19; 210/758; 60/641.2
[58] Field of Search ............... 423/220, 224, 226, 234, 423/514, DIG. 19, 573 G, 573 R; 60/641.2–641.5; 210/753, 754, 756, 758, 759

[56] References Cited

U.S. PATENT DOCUMENTS

| | | | |
|---|---|---|---|
| 1,570,253 | 1/1926 | Howard | 423/514 |
| 3,097,925 | 7/1963 | Pitts, Jr. et al. | 423/573 |
| 3,969,479 | 7/1976 | Lonnes et al. | 423/224 |
| 4,009,251 | 2/1977 | Meuly | 423/226 X |
| 4,011,304 | 3/1977 | Mancini et al. | 423/226 X |
| 4,123,506 | 10/1978 | Spevack | 423/224 X |
| 4,196,183 | 4/1980 | Li | 423/224 X |
| 4,202,864 | 5/1980 | Spevack | 423/220 |
| 4,363,215 | 12/1982 | Sharp | 423/226 X |

OTHER PUBLICATIONS

Kuwada, "Pollution Control for Geothermal Power Plants", AIChE Symposium Series, 1973, pp. 772–775.

Primary Examiner—Earl C. Thomas
Attorney, Agent, or Firm—B. G. Colley

[57] ABSTRACT

Fluid streams containing hydrogen sulfide from a steam turbine or from a sour gas stream are contacted with an aqueous solution of a polyvalent metal chelate and an oxidizing agent whereby the hydrogen sulfide is converted to free sulfur and then to soluble sulfur compounds. The metal chelate is reduced to a lower oxidation state metal chelate and reduced metal chelate is subsequently oxidized with air back to the higher oxidation state and reused.

15 Claims, 2 Drawing Figures

REMOVAL OF HYDROGEN SULFIDE FROM FLUID STREAMS WITH MINIMUM PRODUCTION OF SOLIDS

BACKGROUND OF THE INVENTION

This invention relates to a process wherein a fluid stream containing hydrogen sulfide is contacted with an aqueous solution containing a polyvalent metal chelate and the hydrogen sulfide in said stream is removed.

It is known from U.S. Pat. No. 4,123,506 dated Oct. 31, 1978 and U.S. Pat. No. 4,202,864, dated May 13, 1980 that geothermal steam containing $H_2S$ can be purified by contacting the steam with a metal compound that forms insoluble metallic sulfides.

It is also known from U.S. Pat. No. 4,196,183, dated Apr. 1, 1980 that geothermal steam containing $H_2S$ can be purified by adding oxygen and passing it through an activated carbon bed.

Various processes for hydrogen sulfide control in geothermal steam are outlined in the U.S. Department of Energy Report #DOW/EV-0068 (March 1980) by F. B. Stephens, et al.

U.S. Pat. No. 4,009,251 dated Feb. 22, 1977 discloses the removal of hydrogen sulfide from gaseous streams with metal chelates to form sulfur substantially without the formation of sulfur oxides.

In U.S. patent application Ser. No. 325,472 filed Nov. 27, 1981, there is disclosed a process for the removal of hydrogen sulfide from geothermal steam. However, this process generates free sulfur or sulfur solids which must be removed. The instant process is superior in that the sulfur solids are minimized by being converted to soluble sulfur compounds.

SUMMARY OF THE INVENTION

The present invention is directed to a process wherein fluid streams containing $H_2S$ are purified by converting the $H_2S$ to soluble sulfur compounds by using a polyvalent metal chelate and a water soluble oxidizing agent.

The process of this invention has the following steps:

(A) contacting said stream in a first reaction zone with an aqueous solution at a pH range suitable for removing hydrogen sulfide whereby said solution contains an effective amount of a polyvalent metal chelate and an effective amount of an oxidizing agent capable of oxidizing elemental sulfur to soluble sulfur compounds whereby said hydrogen sulfide is converted to free sulfur and then to soluble sulfur compounds and said polyvalent metal chelate is reduced to a lower oxidation state metal chelate, (B) contacting said solution containing reduced polyvalent metal chelate in a second reaction zone with an oxygen containing gas stream whereby said metal chelate is continuously reoxidized, and (C) continuously recirculating said reoxidized solution back to said first reaction zone.

Advantages of the process described herein are the substantial elimination of sulfur solids and insoluble metal salts which foul piping, heat-exchanger surfaces, cooling tower basins and the like. Such fouling of equipment in geothermal power plants leads to costly downtime for maintenance and loss of power production. Advantages of the process, when used for gas-scrubbing are elimination of the need for expensive mechanical equipment such as settlers, frothers, filters, centrifuges, melters and the like for sulfur removal. This is particularily advantageous when treating streams having low sulfur content and recovery of the sulfur does not warrant the equipment required for its removal from the process.

BRIEF DESCRIPTION OF THE DRAWINGS

FIG. 2 illustrates a process in which this invention is applied to the removal of hydrogen sulfide from a sour gas stream such as a natural gas stream, refinery gas, synthesis gas, or the like.

In FIG. 1 the geothermal steam from line 2 is used to power a steam turbine 4 which is connected to an electric power generator 6. Branch lines 18, 20, and 22 directly supply steam from line 2 to the steam turbine 4, steam ejector 24, and steam ejector 26, respectively. The turbine 4 exhausts through line 8 to a direct contact condenser 10. Cooling water containing chelated iron (ferric chelate) from line 28 is sprayed into condenser 10 for this condensation and passes from the condenser 10 through line 14 to the hot well 16 operating at 100°–125° F. Non-condensable gases such as $CO_2$, $H_2$, $CH_4$, $N_2$, $O_2$, and part of the $H_2S$ are removed from the main condenser 10 through line 36 by two steam jet ejectors 24 and 26 and the associated condensers 12 and 13. The ejectors 24 and 26 are operated by steam supplied by lines 20 and 22 respectively. These ejectors create a partial vacuum or low pressure zone. The exhaust steam from the ejector 24 is carried by line 38 to the condenser 12 and by line 40 to the second ejector 26. The exhaust steam from ejector 26 is carried by line 42 to condenser 13. Cooling water from line 28 is supplied to each of the condensers 12 and 13 by lines 32 and 30 respectively. The condensed steam from condensers 12 and 13 flows by means of lines 44 and 46 to the hot well 16. The non-condensable gases including the remaining $H_2S$ and the exhaust steam are then fed to an incinerator or $SO_2$ generator 54 through line 48 for oxidation of the $H_2S$ to $SO_2$. An oxygen containing gas such as air, oxygen, or mixtures thereof is supplied to the generator 54 by line 55. The $SO_2$ generator 54 is a conventional catalytic incinerator, however, a thermal incinerator may be used if desired.

Figure 1:
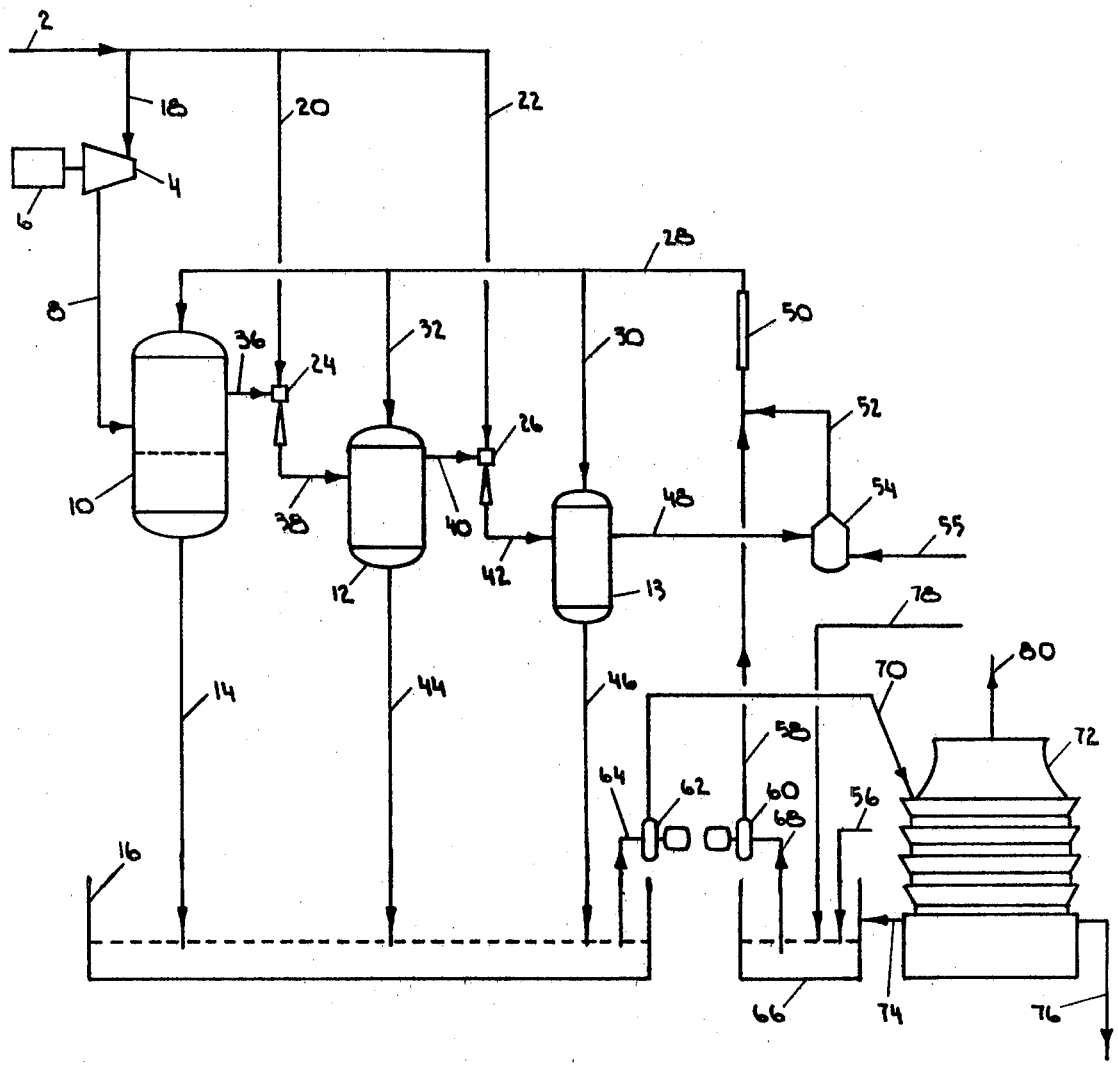
FIG. 1 illustrates a process in which this invention is applied for the oxidation of hydrogen sulfide contained in a liquid stream produced by the condensation of geothermal steam.

The $SO_2$ generated in the incinerator 54 is fed by line 52 to the cold water line 58 from the pump 60. The water and gaseous $SO_2$ are thoroughly mixed in an inline mixer 50. The water containing dissolved $SO_2$ is then fed to the condensors 10, 12, and 13 by lines 28, 32, and 30.

Sufficient amounts of polyvalent metal chelate is added after start-up to the cold well 66 by line 56 to make up for the amounts lost by continuous blowdown through line 76. In a similar manner, caustic solutions such as aqueous sodium hydroxide are added by line 78 to the cold well 66 to adjust or maintain the pH of the recirculating solution within the desired range of 5 to 11 and preferably 7 to 9.

The aqueous solution in the cold well 66 is withdrawn by line 68 into pump 60 and pumped by line 58 to the static mixer 50 and thence to the condensors 10, 12, and 13.

The aqueous solution in the hot well 16 is withdrawn by line 64 into pump 62 and pumped through line 70 to the cooling tower 72 where the solution is sprayed into the tower and oxidized by air circulation. Line 76 is provided for continuous solution withdrawal. About 10 percent of the steam from line 2 is continuously withdrawn from line 76 which is typically reinjected into the underground steam-bearing formation. Line 74 is provided to allow the cooled solution to recycle back to the cold well 66. The cooling tower 72 is vented to the atmosphere at 80 with substantially no $H_2S$ being present.

Figure 2:
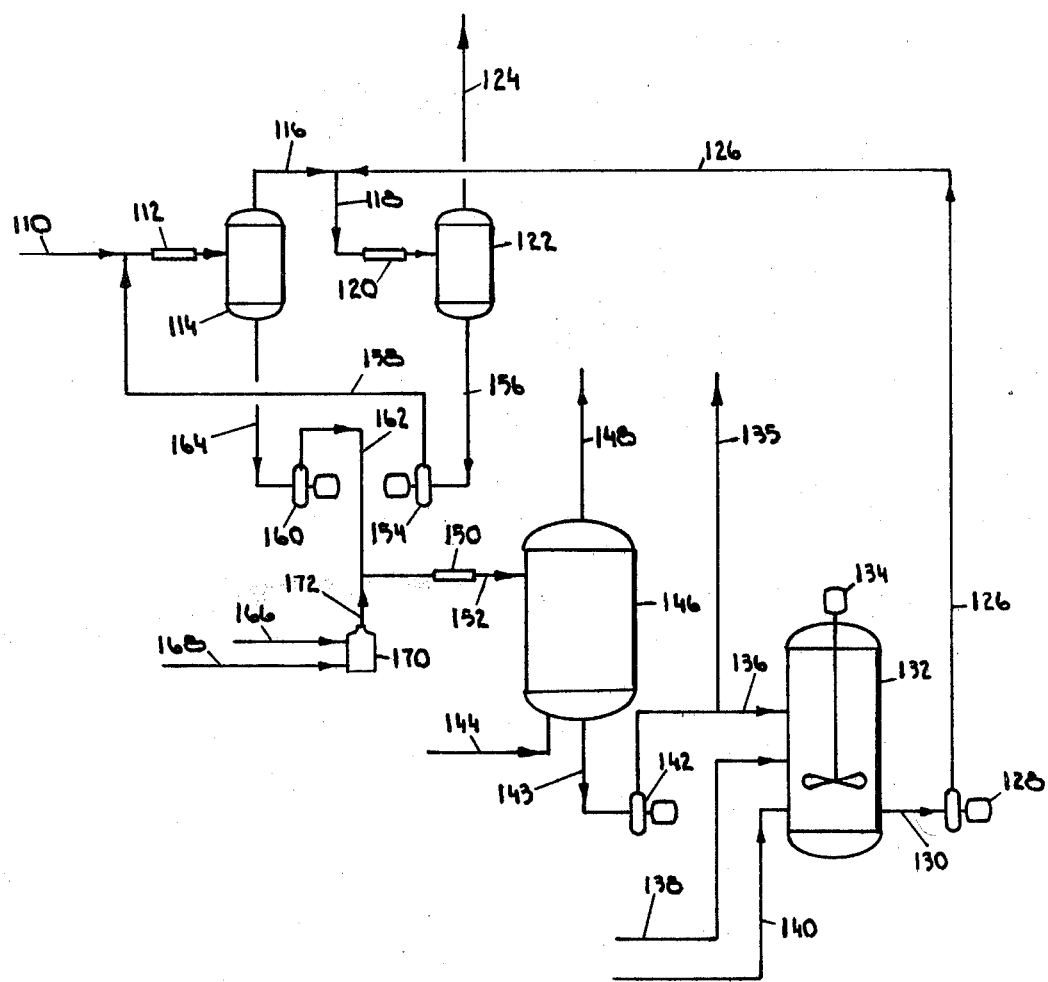

In FIG. 2, a sour gas feed is led by line 110 where it is combined with the aqueous solution from line 158 and thence to a static mixer 112 for good gas-liquid contact. The combined streams are fed into the first gas-liquid separator 114. The gaseous effluent from the separator 114 is led overhead by line 116 where it is combined with the recycled aqueous solution in line 126 and fed by line 118 to a static mixer 120 and then to a second gas-liquid separator 122.

The overhead gas from the second separator 122 is the purified or sweetened gas product of this process is removed by line 124 while the liquid bottoms are removed by line 156, pump 154, and recycled by line 158 to the first separator 114.

The bottoms from the first separator 114 are removed by line 164 to the pump 160 and pumped through line 162 to the static mixer 150. Just before entering the mixer 150, the line 162 is combined with sulfur dioxide ($SO_2$) from line 172.

The $SO_2$ in line 172 is provided by the $SO_2$ generator or incinerator 170, $H_2S$ is fed into the generator 170 by line 166 from any convenient source such as a pressurized tank or the like. A oxygen containing gas such as oxygen, air, or air enriched by oxygen is provided by line 168 from any convenient source.

The mixed $SO_2$ and aqueous liquid from the mixer 150 is fed by line 152 into the oxidation reactor 146 where the non-absorbed gases are purged overhead by line 148. An oxygen containing gas is supplied to the oxidizer 146 by the line 144 so that the polyvalent metal chelate is oxidized to its higher state of oxidation. The bottoms from the oxidizer 146 is removed by line 143 to the pump 142.

A purge line 135 is provided for the continuous removal of a portion of the aqueous solution from the pump line 136.

The pump line 136 feeds into a mixing tank 132 where a mixer 134 stirs the chemicals that are added. Line 138 is provided for the addition of aqueous caustic solution to the tank 132 so that the pH can be adjusted within the desired range. Line 140 is provided for the addition of make up polyvalent metal chelate. The contents of the mixing tank 132 are removed by line 130 to the pump 128 for recycle back to the second separator 122 by line 126.

Alternatively, either $SO_2$ or metal chelate may be fed to the process at points other than described above.

DETAILED DESCRIPTION OF THE INVENTION

The polyvalent metal chelates used herein are aqueous soluble, polyvalent metal chelates of a reducible polyvalent metal, i.e., a polyvalent metal which is capable of being reduced and a chelating or complexing agent capable of holding the metal in solution. As used herein, the term polyvalent metal includes those reducible metals having a valence of two or more. Representative of such polyvalent metals are chromium, cobalt, copper, iron, lead, manganese, mercury, molybdenum, nickel, palladium, platinum, tin, titanium, tungsten and vanadium. Of said polyvalent metals, iron, copper and nickel are most advantageously employed in preparing the polyvalent metal chelate; with iron being most preferred.

The term "chelating agent" is well-known in the art and references are made thereto for the purposes of this invention. Chelating agents useful in preparing the polyvalent metal chelate of the present invention include those chelating or complexing agents which form a water-soluble chelate with one or more of the aforedescribed polyvalent metals. Representative of such chelating agents are the aminopolycarboxylic acids, including the salts thereof, nitrilotriacetic acid, N-hydroxyethyl aminodiacetic acid and the polyaminocarboxylic acids including ethylenediaminetetraacetic acid, N-hydroxyethylethylenediaminetriacetic acid, diethylenetriaminepentaacetic acid, cyclohexene diamine tetraacetic acid, triethylene tetraamine hexaacetic acid and the like; aminophosphonate acids such as ethylene diamine tetra(methylene phosphonic acid), aminotri(methylene phosphonic acid), diethylenetriamine penta(methylene phosphonic acid); phosphonate acids such as 1-hydroxy ethylidene-1,1-diphosphonic acid, 2-phosphono acetic acid, 2-phosphono propionic acid, and 1-phosphono ethane 1,2-dicarboxylic acid; polyhydroxy chelating agents such as monosaccharides and sugars (e.g., disaccharides such as sucrose, lactose and maltose), sugar acids (e.g., gluconic or glucoheptanoic acid); other polyhydric alcohols such as sorbitol and manitol; and the like. Of such chelating agents, the polyaminocarboxylic acids, particularly ethylenediaminetetraacetic and N-hydroxyethylethylenediaminetriacetic acids, are most advantageously employed in preparing the polyvalent metal chelate used herein. Most preferably, the polyvalent metal chelate is the chelate of a ferric iron with a polyaminocarboxylic acid, with the most preferred polyaminocarboxylic acids being selected on the basis of the process conditions to be employed. Ethylenediaminetetraacetic acid and N-hydroxyethylethylenediaminetriacetic acid are generally particularly preferred.

The oxidizing agent used herein to oxidize elemental sulfur to soluble sulfur compounds is preferably sulfur dioxide which can be generated by oxidizing a side stream of hydrogen sulfide. Other oxidizing agents that can be used are the alkali metal salts of inorganic oxidizing acids such as perchloric, chloric, hypochlorous and permanganic acids.

For the purpose of this invention, an effective amount of a polyvalent metal chelate is that amount ranging from about a stoichiometric amount based on the hydrogen sulfide absorbed to the amount represented by the solubility limit of the metal chelate in the solution. In like manner, an effective amount of an oxidizing agent is that amount ranging from about a stoichiometric amount based on the free sulfur formed to about five times the stoichiometric amount.

The temperature in the aforementioned reaction zones should be maintained in the range from 0° to 95° C.

Detailed examples of the invention are given below for purposes of further illustrating the invention.

CONTROL I

A reaction was carried out in a 1-liter, temperature controlled reactor equipped with a condenser, thermometer, sampling port and fitted spargers for hydrogen sulfide ($H_2S$), sulfur dioxide ($SO_2$) and air addition.

The reactor was charged with 800 gm water and 23.7 gms. (0.0716 moles) $Fe^{+3}HEDTA$. The temperature was controlled at 60° C. and pH was controlled with caustic at 8.0 pH during the run. $H_2S$ was fed to the reactor at a rate of 13 cc/min. for about 9 minutes to give 0.005 moles of $H_2S$. Substantially all of the $H_2S$ was oxidized, by the ferric iron, to elemental sulfur and the ferric iron was reduced to the ferrous state. The ferrous iron was then regenerated to ferric iron by sparging air to the reactor. Air was sparged at a rate of about 700 cc/min. for about 9 minutes. The reaction was then repeated by alternately sparging $H_2S$ and air for a total of five cycles.

The solution was then weighed and filtered onto a tared filter paper for gravimetric determination of sulfur solids and the filtrate was analysed for soluble sodium thiosulfate. Analyses showed 1570 ppm sulfur solids and sodium thiosulfate was below the detectable limit (<20 ppm).

EXAMPLE I

The reaction was again carried out using the method and conditions of Control I, except that sulfur dioxide ($SO_2$) was sparged into the reactor to react with sulfur to form soluble sulfur compounds. $SO_2$ was sparged during each of the five cycles at a rate of about 85 cc/min. for 4 minutes or a total of 0.0694 mole $SO_2$.

Analyses showed only 36 ppm sulfur solids and 4562 ppm sodium thiosulfate.

CONTROL 2

To a 1-liter agitated reactor in a constant temperature bath was added about 500 gm. water, 14.8 gm. (0.0448 mole) ferric iron-N(hydroxyethyl)-ethylene diaminetriacetic acid chelate ($Fe^{+2}.HEDTA$), and 1.15 gm. (0.0148 mole) of sodium sulfide as a simulant for the absorption of 0.0148 mole of $H_2S$. The pH was adjusted to 7.0 with $NH_4OH$ or $HCl$. The reaction was carried out for 30 minutes at 20° C. during which time substantially all of the sulfide was oxidized by the ferric iron to elemental sulfur. The iron was reduced to the ferrous state.

The total reaction solution was then weighed and filtered onto a tared filter paper for gravimetric determination of weight percent sulfur solids. The tared filter paper was dried and weighed. The weight percent sulfur solids, based on solution weights, was calculated. The filtrate was analysed for weight percent thiosulfate ($S_2O_3^=$) and sulfate ($SO_4^=$) by ion chromatography.

Analytical results showed 966 ppm sulfur solids and 164 ppm sodium thiosulfate ($Na_2S_2O_3$). Sulfate ($SO_4^=$) was below detectable limits, i.e., less than 10 ppm.

EXAMPLE II

The reaction was carried out using the method and conditions of Control 2, except that 2.95 gms. of sodium sulfite was added. This represents a stoichiometric amount with 50% excess with respect to the sodium sulfide of Control 2.

Analytical results showed 149 ppm sulfur solids and 3440 ppm sodium thiosulfate.

EXAMPLE III & CONTROL 3

The reaction was carried out using the method and conditions of Control 2, except the pH was controlled at 8.0. With no sulfite addition (Control 3) analysis showed 953 ppm sulfur solids and 232 ppm sodium thiosulfate. With sulfite addition, (Example III) analysis showed only 53 ppm sulfur solids and 3412 ppm sodium thiosulfate.

EXAMPLE IV & CONTROL 4

The reaction was again carried out using the method and conditions of Control 2 except the pH was controlled at 6.0.

With no sulfite addition, (Control 4) analysis showed 968 ppm sulfur solids and 149 ppm sodium thiosulfate. With sulfite addition, (Example IV) analysis showed 163 ppm sulfur solids and 3370 ppm sodium thiosulfate.

CONTROL 5

The reaction was again carried out using the method and conditions of Control 1, except that pH was not controlled. The pH fell to about 3.6 resulting in nearly complete loss of $H_2S$ abatement efficiency and loss of $SO_2$ absorption. Most of the $Na_2S_2O_3$ was probably formed initially at the higher pH.

Results of the Examples and Controls are shown in Table I.

TABLE I

| | pH | ppm Solids | ppm $Na_2S_2O_3$ | Remarks |
|---|---|---|---|---|
| Control 1 | 8.0 | 1570 | N.D. | pH control/no $SO_2$ feed |
| Example I | 8.0 | 36 | 4562 | pH control/with $SO_2$ feed |
| Control 2 | 7.0 | 966 | 164 | No sulfite addition |
| Example II | 7.0 | 149 | 3440 | With sulfite addition |
| Control 3 | 8.0 | 953 | 232 | No sulfite addition |
| Example III | 8.0 | 53 | 3412 | With sulfite addition |
| Control 4 | 6.0 | 968 | 149 | No sulfite addition |
| Example IV | 6.0 | 163 | 3370 | With sulfite addition |
| Control 5 | 3.6–8.0 | 58 | 2054 | No pH contr/with $SO_2$ feed |

N.D. — none detected

We claim:
1. A continuous process for removing hydrogen sulfide from a fluid stream containing hydrogen sulfide which comprises
   (A) contacting said stream in a first reaction zone with an aqueous solution at a pH range suitable for removing hydrogen sulfide whereby said solution contains an effective amount of a polyvalent metal chelate and an effective amount of an oxidizing agent capable of oxidizing elemental sulfur to soluble sulfur compounds whereby said hydrogen sulfide is converted to free sulfur and then to soluble sulfur compounds and said polyvalent metal chelate is reduced to a lower oxidation state metal chelate,
   (B) contacting said solution containing reduced polyvalent metal chelate in a second reaction zone with a oxygen containing gas stream whereby said metal chelate is continuously reoxidized, and
   (C) continuously recirculating said reoxidized solution back to said first reaction zone.
2. The process as set forth in claim 1 wherein the amount of metal chelate is from about stoichiometric based on the hydrogen sulfide absorbed to the solubility limit of said metal chelate in said solution.
3. The process as set forth in claim 1 wherein the amount of oxidizing agent is from about stoichiometric based on the free sulfur formed to about five times the stoichiometric amount.

4. The process as set forth in claim 1 wherein the pH ranges from 5 to 11.

5. The process as set forth in claim 1 wherein the reaction zones are maintained at a temperature in the range from about 0° to 95° C.

6. The process as set forth in claim 1 wherein the oxidizing agent is selected from the group consisting of sulfur dioxide and the alkali metal salts of inorganic oxidizing acids.

7. The process as set forth in claim 6 wherein the oxidizing acids are selected from the group consisting of sulfurous, perchloric, cloric, hypochlorous and permanganic acids.

8. The process as set forth in claim 1 wherein said fluid stream is a geothermal stream.

9. The process as set forth in claim 1 wherein said fluid stream is a sour gas stream.

10. The process as set forth in claim 1 wherein said polyvalent metal chelate is an iron chelate.

11. The process of claim 10 wherein the iron chelate is a chelate of iron with a aminopolycarboxylic acid.

12. The process of claim 11 wherein the aminopolycarboxylic acid is selected from the group consisting of ethylenediaminetetraacetic acid, diethylenetriamine pentaacetic acid, N-hydroxyethylethylene diamine triacetic acid, diethylenetriamine pentaacetic acid, cyclohexene diamene tetraacetic acid, triethylenetetraamine hexaacetic acid, nitrilotriacetic acid, and N-hydroxyethyliminodiacetic acid.

13. The process of claim 10 wherein the iron chelate is a chelate of iron with an amine phosphonic acid.

14. The process of claim 13 wherein the amine phosphonic acid is selected from the group consisting of ethylenediamine tetra(methylene phosphonic acid), aminotri(methylene phosphonic acid), and diethylenetriamine penta(methylene phosphonic acid).

15. The process of claim 10 wherein the iron chelate is a chelate of iron with an phosphonate acid.

* * * * *